United States Patent Office 3,436,797
Patented Apr. 8, 1969

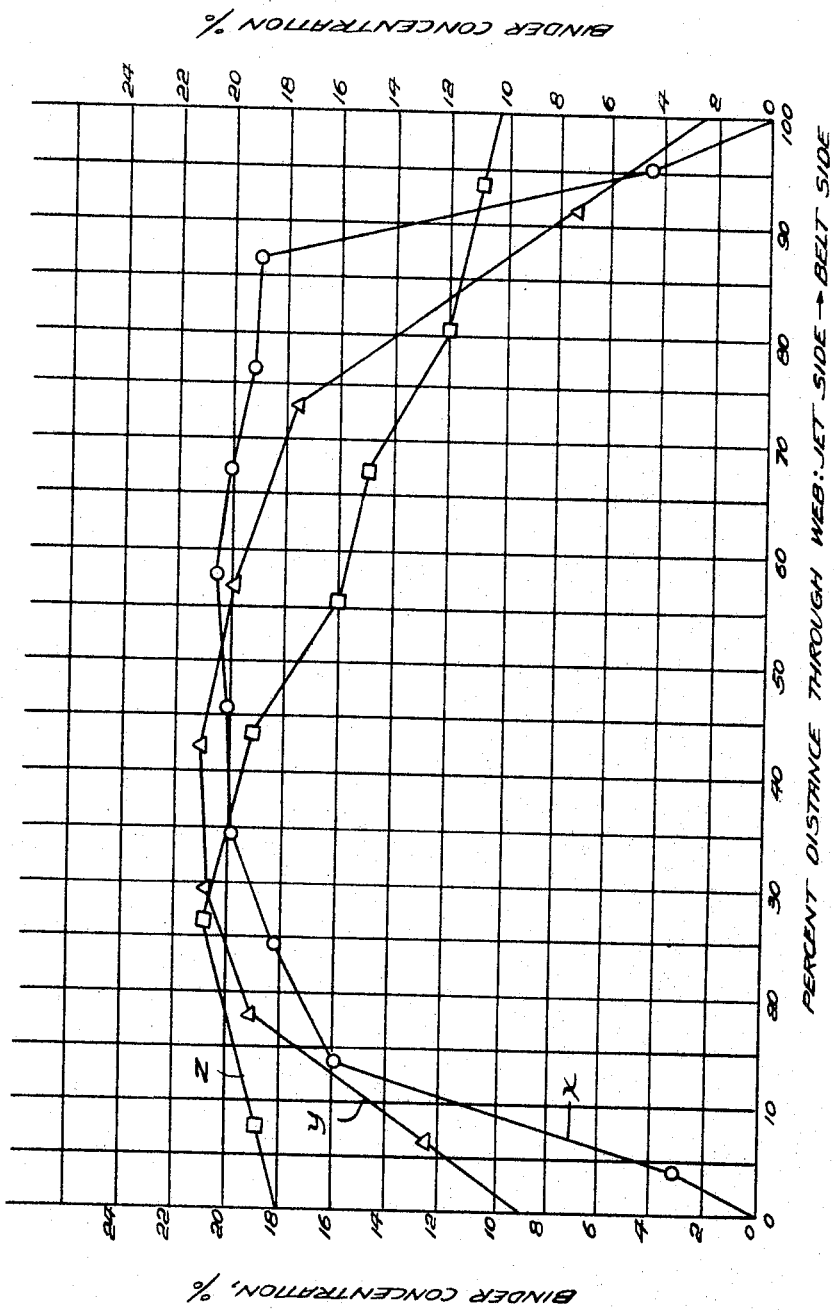

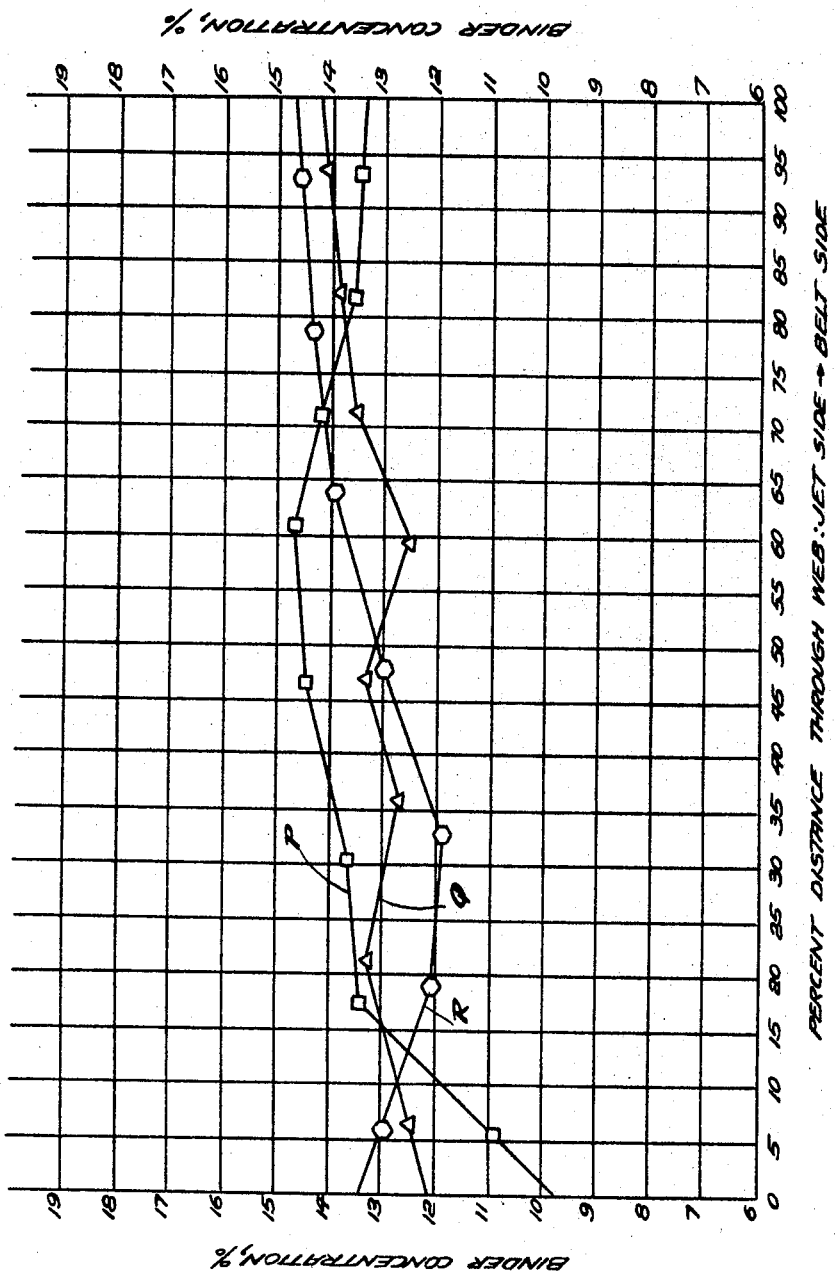

3,436,797
METHOD AND APPARATUS FOR CHARGING AND COMBINING CONTINUOUS FILAMENTS OF DIFFERENT POLYMERIC COMPOSITION TO FORM A NONWOVEN WEB
Walter L. Graf, Wilmington, Del., and Francis Joseph Medeiros, Hendersonville, Tenn., assignors to E. I. du Pont de Nemours and Company, Wilmington, Del., a corporation of Delaware
Filed Mar. 8, 1965, Ser. No. 437,859
Int. Cl. D02g 3/00; D04h 17/00; D01g 25/00
U.S. Cl. 28—1                                                4 Claims

ABSTRACT OF THE DISCLOSURE

A method and apparatus to compensate for differences in aerodynamic drag and momentum between different types of polymeric filaments being separately forwarded, then combined and collected as a nonwoven web wherein the different types of filaments are separately charged in separate corona charging zones prior to being combined to permit regulation of the distribution of the different filament species in the web.

---

This invention relates to an apparatus and process for combining two bundles of continuous filaments of different composition and uniformly blending the filaments by regulation of electrostatic charges on the two bundles.

In the preparation of nonwoven fabrics from continuous filaments by the recently developed process described in British Patent 932,482, a multifilament strand of continuous filaments under tension is electrostatically charged by known techniques, for example, by triboelectric charging or by passing the filaments through a corona-discharge zone; the charged filaments are then forwarded by means of a jet device toward a web-laydown zone; the tension on the filaments is released as they exit the jet device thereby permitting them to separate due to the repelling effect of the applied electro-static charge; and the filaments, while thus separated, are collected as a nonwoven web.

A preferred method for effecting bonding of the web, thereby converting it to a strong nonwoven fabric, is by means of binder filaments distributed throughout the nonwoven web of matrix filaments. Since the binder and matrix filaments come from different sources, it has been the practice in the aforementioned process to combine the strand of binder filaments with the strand of matrix filaments before entry into the jet device. The binder filaments have a lower softening temperature or melting point than the matrix filaments constituting essentially the remainder of the filaments of the web. Upon subsequent heating of the nonwoven web, the binder filaments adhere to the matrix filaments while retaining their filamentary character, or they may melt and flow to the matrix filament crossing points and form granule bonds upon cooling. In one form of the process the binder filaments are composed of a copolymer derived from ethylene glycol, terephthalic acid and isophthalic acid. The matrix filaments are composed of a homopolymer derived from ethylene glycol and terephthalic acid.

It is essential that the binder filaments be uniformly distributed in the nonwoven web in order to provide high delamination resistance, particularly in nonwoven fabrics which are to be laminated to other materials. Unexpectedly, it has been found that when the binder and matrix filament strands are combined prior to charging, the binder filaments tend to remain associated with each other and the matrix filaments tend to remain associated with each other thereby leading to nonuniform distribution of the binder throughout the web. Now in the present invention a method has been discovered which permits charging of filaments of different compositions in such a manner that it provides a means for keeping the filaments uniformly dispersed when tension is released from the bundle of blended filaments.

In the basic process of the British patent an aspirating jet is used to forward the charged filaments. The corona-discharge technique described in DiSabato and Owens, U.S. Patent 3,163,753 may be employed to charge the filaments. The trajectory of a given filament in the jet-forwarding device or in any similar aerodynamic device is a function of the vertical and horizontal drag forces acting on it and of the horizontal electrostatic forces tending to drive it to the walls of the jet. The charged fibers moving through the jet create an electric field which exerts a force on each and every filament in the field. If the aerodynamic or drag forces acting on homopolymer (Ho) and copolymer (Co) fibers are the same (i.e., if both fibers have identical deniers, surface characteristics, and linear velocities) and if the electrostatic surface charge density on both Ho and Co fibers is the same, then the Ho and Co fibers will have identical trajectories, and the filaments in the jet will retain their relative positions in the bundle. If the copolymer has a greater surface charge density than the homopolymer, the electrostatic forces acting on the former are greater than on the latter and the copolymer is driven nearer the jet walls and travels in an envelope outside the envelope of homopolymer fibers. The resulting web therefore, has binder-rich surfaces. Conversely, if the surface charge density on the copolymer filaments is less than that on the homopolymer filaments, the electrostatic forces acting on the former are less than on the latter, and the copolymer travels in an envelope within the homopolymer envelope of filaments. The resulting web has binder-lean surfaces.

A purpose of the present invention is to provide a process and apparatus for uniformly blending filaments of different composition.

Another purpose is to provide a process and apparatus for depositing on a collecting surface a web of a uniform blend of continuous filaments of two or more different cmpositions.

Still another purpose is to provide a process for controlling the relative location of filaments of two different compositions as they emerge from a turbulent gas jet into a zone of relatively low tension.

The apparatus of the invention comprises
(1) Means for continuously providing two separate filament bundles of different compositions,
(2) Means for forming the separate filament bundles into ribbons,
(3) A first corona-charging means for applying an electrostatic charge to a first bundle of filaments,
(4) A second corona-charging means for applying an electrostatic charge to a second bundle of filaments, (in the presence or absence of said first bundle of filaments),
(5) Means for combining the bundles of filaments,
(6) An aspirating jet for forwarding and directing the combined bundles of charged filaments and
(7) Receiver means for collecting the filaments as a random nonwoven web.

In the process of the invention two bundles of substantially parallel continuous filaments of differing compositions may be continuously provided as by extrusion from two spinnerets, separately forwarded under tension through separate corona-charging zones, electrostatically charged to the same polarity while in said zones, combined into a single bundle, forwarded and directed by means of a jet device toward a receiver and collected thereon in substantially tensionless condition as a nonwoven web. Alternatively, one bundle may be forwarded under tension through a first corona-charging zone, electrostatically charged while in said zone, combined with another bundle of filaments, and the combined filament bundles forwarded under tension through a second corona-charging zone, and electrostatically charged while in said zone prior to entering the jet device.

The electrical charges in micro-coulombs per square meter for filaments of each composition emerging from the relaxing zone can thus be adjusted by regulation of the relative amount of charge deposited on filaments of each composition in the two separate corona-charging zones. The ratio of electrical charge imparted will be such as to compensate for differences in aerodynamic drag and momentum such as result from difference in speed, denier, or surface characteristics between the two types of filament and thus provide a uniform intermingling of the filaments from the different filament bundles.

Now referring to the figures which illustrate certain embodiments of the invention:

Figure 4:
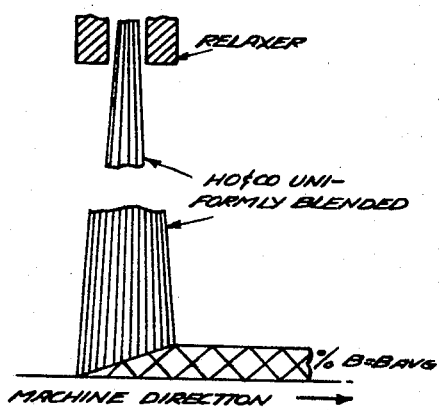
Figure 4A:
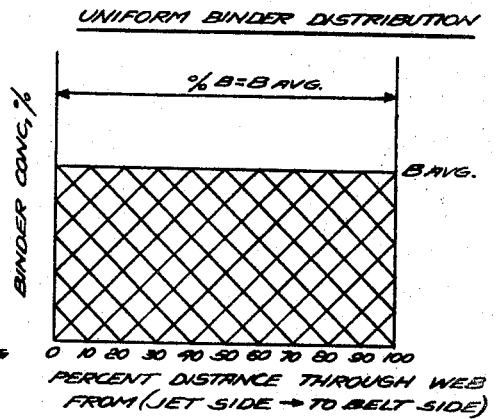
Figure 5:
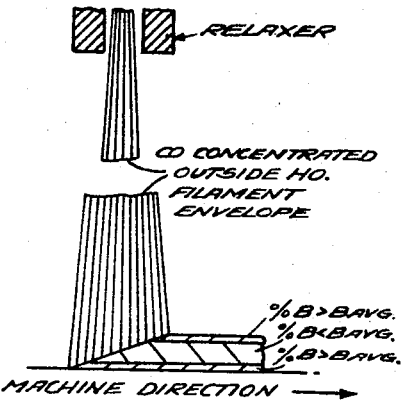
Figure 5A:
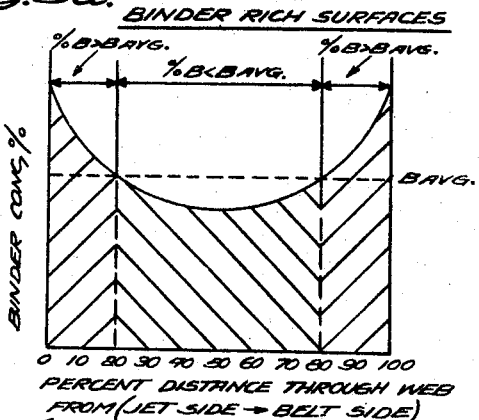
Figure 6:
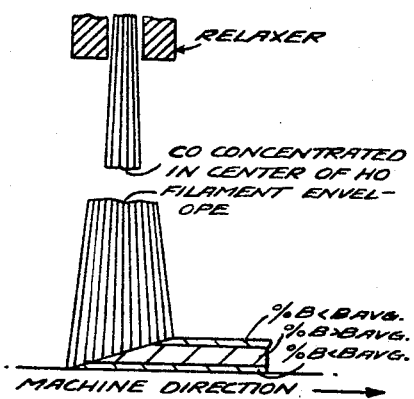
Figure 6A:
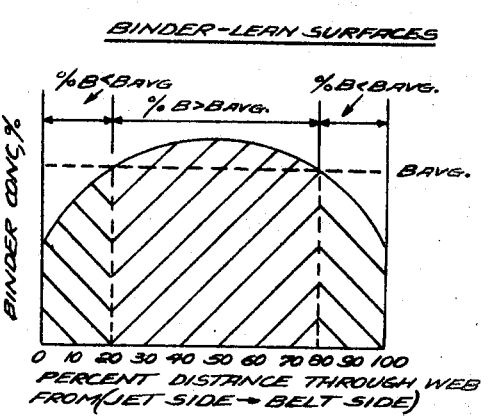

FIGURES 4, 5, and 6 represent a jet device forwarding blended filaments charged at various ratios to a belt while FIGURES 4a, 5a and 6a are charts showing the effect of various charging ratios on fiber distribution through the thickness of nonwoven webs prepared from blended filaments of equal denier passing from the jet device at the same speed.

Figure 1:
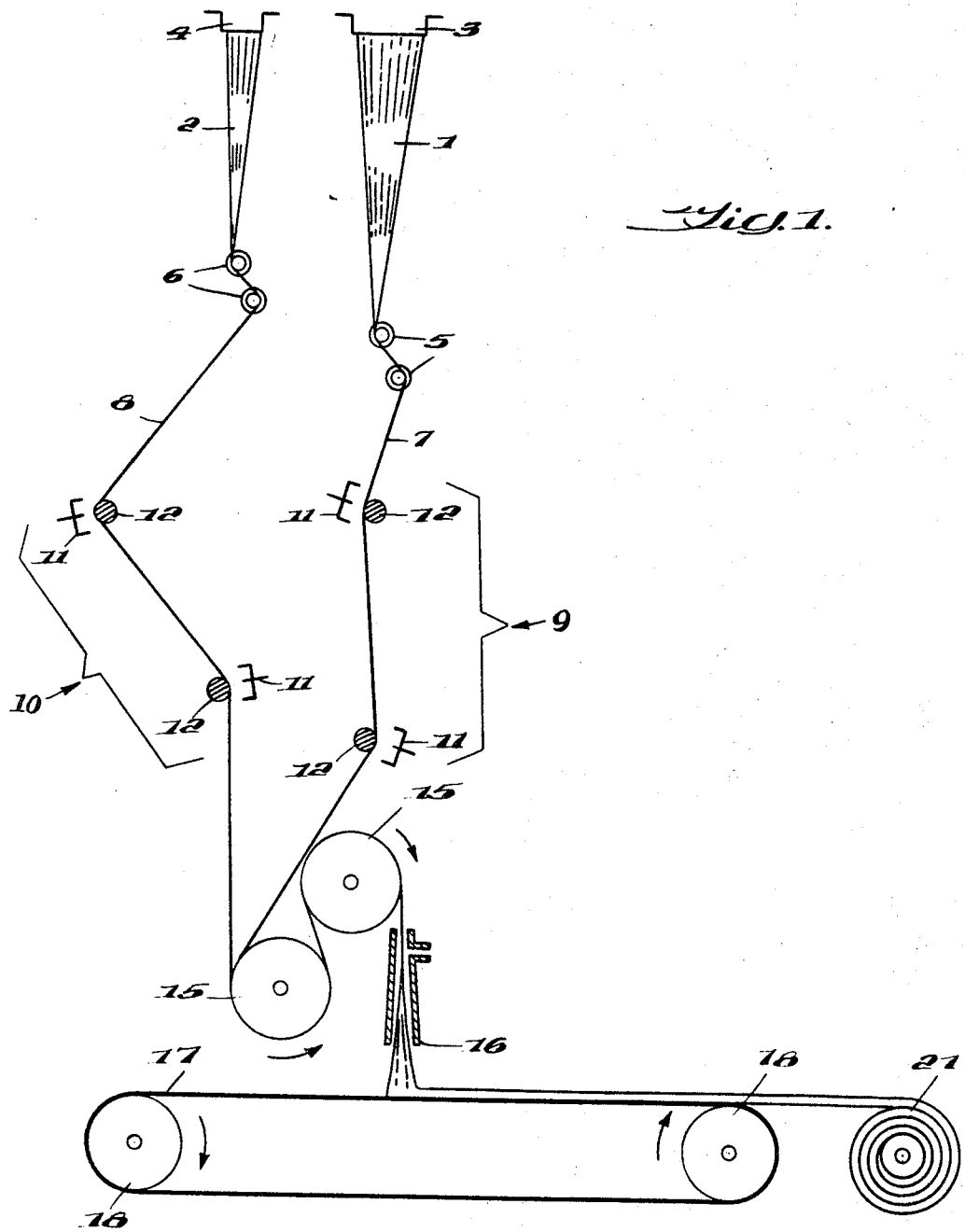
FIGURE 1 is a schematic representation showing an apparatus for spinning filament bundles from two spinnerets and applying tension thereto, separately charging (with the same polarity) the two bundles in corona-charging zone, combining the bundles, and forwarding the combined bundle through an aspirating slot-jet towards a receiver.

FIGURE 7 is a graph of analytical data from samples taken through the thickness of webs, the web having been produced by apparatus similar to that of FIGURE 1 using various corona-charging conditions and using room temperature air in the aspirating jet.

FIGURE 8 is a graph of analytical data from samples taken through the thickness of webs produced by apparatus similar to that of FIGURE 1 and using air at 220° C. in the jet to permit shrinkage of filaments.

An understanding of the process may be obtained by reference to FIGURE 1 showing one embodiment of the apparatus and process. Separate bundles of continuous homopolymer filaments 1 and continuous copolymer filaments 2 are shown issuing from homopolymer spinneret 3 and copolymer spinneret 4. The filaments are handled without twisting, interlacing or entangling prior to corona charging. The homopolymer filaments are spun from a spinneret of about 250 holes while the copolymer filaments are spun from a spinneret of about 50 holes. The multifilament homopolymer bundle passes over a pair of concave converging guides 5 arranged on each side of the bundle. The bundle is thereby reduced in size and emerges from the pair of convergence guides as a flat ribbon about one filament thick. The copolymer bundle having about 50 filaments is forwarded from spinneret 4 to a pair of convex spreading guides 6 which provide a ribbon of filaments substantially the same in width as the ribbon of homopolymer from the concave convergence guides. The copolymer ribbon is about 1 filament thick. The concave and convex guides may be rotated about their longitudinal axes and may be power driven. The use of concave and convex guides is described in greater detail in copending and coassigned application Ser. No. 431,690 to Medeiros et al. filed on Feb. 10, 1965 now Patent No. 3,384,944.

The bundles of homopolymer filaments 7 and copolymer filaments 8 are forwarded respectively in the form of ribbons to homopolymer charging zone 9 and copolymer charging zone 10. Each of the charging zones is comprised of two ion guns 11, one on each side of the ribbon of filaments, and two grounded target bars 12 disposed opposite the ion guns on the other side of the ribbon. The corona-charging apparatus including the ion gun 11 attached to a high voltage source not shown, and target bar 12 are disclosed in detail in the aforementioned patent to DiSabato and Owens. The ion guns comprise a row of needles shielded by a concave focusing device. The target bars 12 may be rotated about their cylindrical axes by means of an electric motor. The ion guns 11 continuously deposit a negative or positive charge on the ribbons of copolymer and homopolymer filaments running against target bars 12.

The ribbons of filaments issuing from the two corona-charging zones, being charged the same polarity and now being the same width are combined on the pair of draw rolls 15 which provide tension for the filaments being drawn from the spinnerets 3 and 4. The combined bundle in ribbon-form is passed from the draw rolls 15 to a slot-jet aspirator 16 which continuously removes the filaments from the draw rolls, forwards and directs the filaments to the receiver and gradually releases tension on the filaments. The filaments fall by gravity in the air stream in substantially tensionless condition to the collecting surface 17 shown as an endless belt continuously forwarded by rolls 18. Since the belt is traveling at a much lower speed than the rate at which filaments are deposited, a random deposit of filaments on the belt is obtained. The web is wound up on roll 21.

The top opening of the jet aspirator is a narrow slot. The jet may be of the type described in copending and coassigned U.S. application Ser. No. 425,839 to Cope et al. filed Jan. 15, 1965, now U.S. Patent No. 3,302,237. The air passing through the jet may be at room temperature. The treated filaments in this case may shrink when the web is subsequently heated to higher temperatures. On the other hand the air passing through the jet may be heated, whereupon the filaments shrink while passing through the jet and are stabilized against further shrinkage when heated. If heated air is used in the jet (e.g., 200 to 270° C.) the copolymer filament may shrink much more than the homopolymer filaments and will thereby accumulate a much greater charge per unit length. This is an important reason for the application of charges of different magnitude although of the same polarity to the two filament bundles.

As the polymer spins from the spinneret at the top of the FIGURE 1, the filaments descend and cool until solidified enough to prevent sticking on the guides 5 and 6. At the same time the filaments are drawn by the draw rolls 15 which are operating at a speed greater than the spinning speed of bundles 1 and 2. The aspirating jet strips the ribbon of filaments from the last roll and forwards the filaments to the receiver. As mentioned previously, introduction of hot air into the jet device may be employed to relax filaments.

In FIGURE 1 the corona-charging currents for the corona-charging zones are regulated by means of separate variable high voltage generators not shown, which provide a potential gradient of 0 to 20 kilovolts/cm. across the gap between each ion gun and its target bar.

Figure 2:
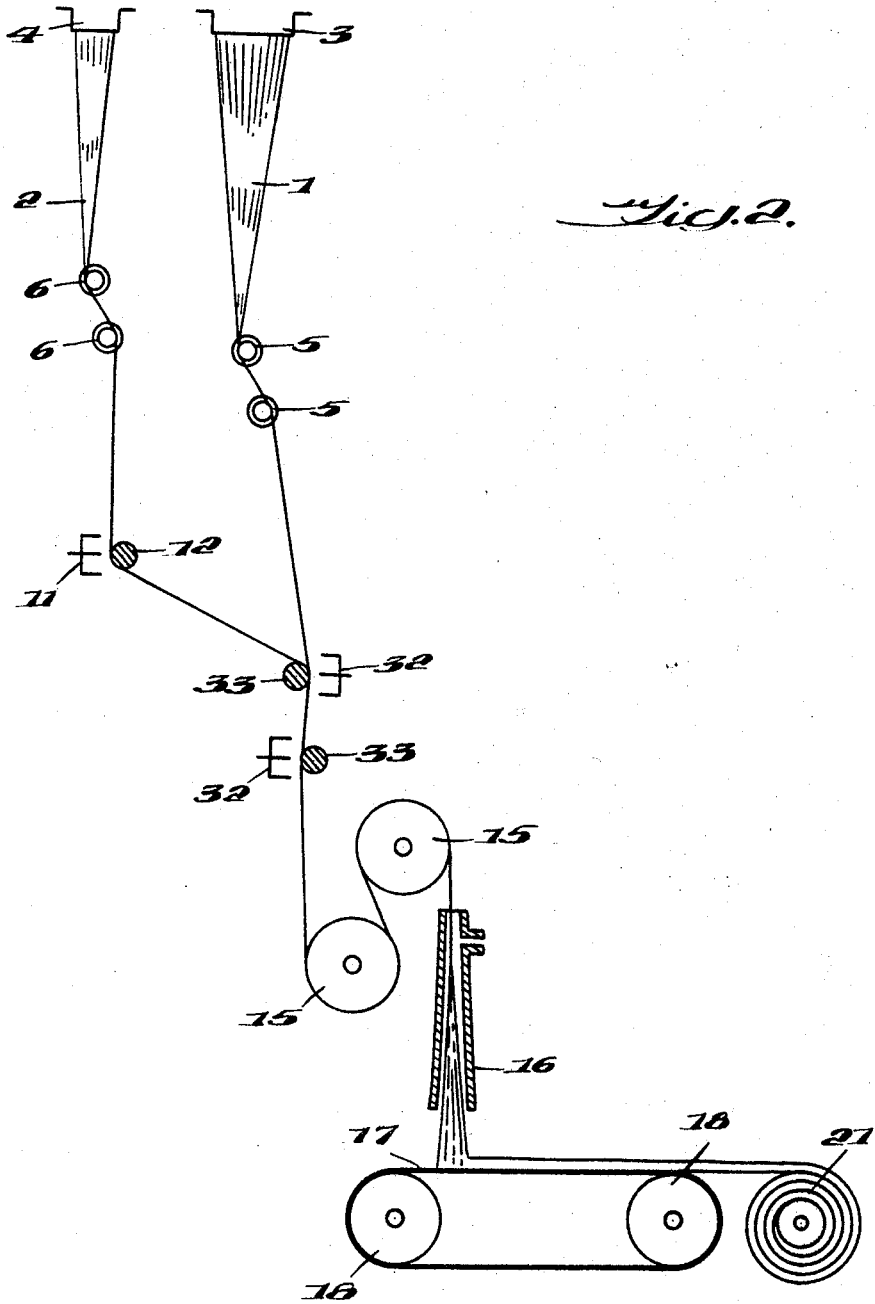
FIGURE 2 is a schematic representation showing an apparatus for separately melt spinning two filament bundles of different composition, electrostatically charging one bundle in a corona-charging zone, combining the two bundles, and then electrostatically charging the combined bundle in a separate corona-charging zone prior to passage through the aspirating jet.

FIGURE 2 shows another arrangement for charging homopolymer and copolymer filaments. In FIGURE 2 the various parts are numbered in a similar fashion to those in FIGURE 1. In this embodiment of the invention the copolymer alone is charged separately using ion gun 11 and target bar 12. Then after the two bundles are combined both the copolymer filaments and the homopolymer filaments are simultaneously charged by ion guns 32 disposed on each side of the combined ribbon together with target bars 33 opposite the ion guns. Tension is provided and the filaments are drawn by means of draw rolls 15. The filaments pass from draw rolls 15 to aspirating slot jet 16 and are then deposited on a moving belt 17. A variable high voltage generator, not shown, provides high potential for copolymer charging while a similar generator, not shown, provides high potential for the charging of the combined filament bundles.

The arrangement of FIGURE 2 is satisfactory for a process in which the filaments from one bundle exit jet 16 with an unsatisfactorily low charge as compared to the filaments of the other bundle. To solve this problem, the former bundle is passed through the separate charging zone using the apparatus of FIGURE 2. The ion gun 11 of FIGURE 2, being separately adjustable, permits changing of the copolymer/homopolymer charge ratio.

The dependence of through-the-web binder distribution on the Co/Ho surface charge density ratio may be explained by analyzing the factors mentioned previously which affect the path a fiber follows as it passes through the jet relaxer. In FIGS. 4, 5, and 6 both the homopolymer and copolymer fibers have identical deniers, surface characteristics, and linear velocities. In FIG. 4, the electrostatic surface charge density on both components is the same. The homopolymer and copolymer filaments then have identical trajectories and the resulting web should have the binder B uniformly distributed from surface to surface as in FIGURE 4a. If the copolymer has a greater surface charge density than the homopolymer, the electrostatic forces acting on the former are greater than on the latter, and the copolymer is driven nearer the relaxer walls and tends to travel in an envelope outside the envelope of homopolymer fibers as in FIGURE 5. The resulting web therefore, should have binder-rich surfaces as represented by FIGURE 5a. Conversely, if the surface charge density on the copolymer filaments is less than that on the latter, the copolymer tends to travel in an envelope within the envelope of homopolymer filaments as in FIGURE 6. The resulting web should therefore, have binder-lean surfaces as represented by FIGURE 6a.

It will be understood that in general the use of a single jet device and the apparatus set-up described herein will produce a relatively narrow web. Ordinarily, several such set-ups are employed side-by-side in order to obtain a web of the desired width, the latter being an aggregation of several narrow width webs.

The process of this invention may be applied to a variety of sheets in which fibers of different compositions are blended. By "different composition" is meant any two materials which when passed through a common corona-charging field collect charges at a different rate measured in microcoulombs/meter$^2$. In other words, the differences may be chemical differences such as when one has two different polymer structures. On the other hand, the differences may be physical such as would be encountered with filaments of different cross section, different denier, or different surface characteristics.

In the following examples charges on filaments are measured by collecting filaments for a given period of time in a pail coulombmeter. The coulombmeter is placed at the exit of the jet and relaxed fibers from the jet are collected, interrupting for a moment the flow of fibers to the receiver belt. The collected sample is weighed and the average denier of the filaments is determined. From these data and the density the charge in microcoulombs/meter$^2$ of filament surface can be determined.

In order to determine the charge on filaments of a given composition in a mixture the apparatus is operated with only one species running through the jet relaxer. Then the other species is run separately, and its charge is measured separately. It was found experimentally that the sum of charges collected for the two species separately was substantially equal to the charge collected for combined filaments.

The binder analyses for the following experiments was obtained by carefully delaminating the deposited webs, removing layers which comprised ⅕ to 1/10 the thickness of the web and extracting. The percentage binder in the layers was determined by extracting with chloroform at reflux temperature (61° C.) for 1.5 hours. After drying the residue, the weight loss was determined by weighing the residue and calculating percent loss.

It will be obvious that the process and apparatus may be used for other purposes in addition to preparation of uniform nonwoven webs.

EXAMPLE 1

A series of webs were made using the system described above for FIGURE 2. A copolymer derived from ethylene glycol, 21 mole percent isophthalic acid and 79 mole percent terephthalic acid was spun from one spinneret and a homopolymer comprising polyethylene terephthalate from the other spinneret.

The copolymer filaments were spun from a 40-hole spinneret and the homopolymer filaments from 192 holes of a 384-hole spinneret. The copolymer filaments were charged separately on one side with a corona-charging unit, the ion gun having 9 needles situated with their points ¾ inch from the target bar. The copolymer filaments were then merged with the homopolymer threadline on the first charging bar of a second corona-charging zone as shown in FIGURE 2. On the second corona zone each of the ion guns comprised 21 needles with their points 11/16 inch from the opposing target bar. The combined filaments were then subjected to additional charging from the opposite side as shown. The combined ribbon of filaments was drawn with two high speed draw rolls. The ribbon of filament was stripped from the draw rolls with a 3-inch wide slot-jet aspirator without application of heat. The filaments emerging from the jet were deposited as a nonwoven web on a moving conveyor belt. With the copolymer guides adjusted for a maximum ribbon width of 2 inches, the combined filament-charging units were set at 400 microamperes per side, and separate copolymer precharging current was varied from 0 to 600 microamperes. Precharging the copolymer filaments before merging with the homopolymer threadline minimized fiber bunching and yielded webs with excellent binder fiber separation when the precharging current was 600 microamperes. Webs produced with this technique contained 96% of the binder filaments as singlets and only 4% as doublets when the charge levels on both the homopolymer and copolymer fibers were greater than 22 microcoulombs/meter$^2$.

In the same experiment the binder distribution through the web from surface to surface was shown to be a function of the relative surface charge densities of the homopolymer and copolymer filaments. The filaments were not heated in the aspirating jet. The copolymer filaments issuing from the jet were 3.17 denier per filament and the homopolymer filaments were 3.09 denier per filaments. The charge ratio at various precharging currents is shown in Table I below.

Table I

| Pre-charge current, $\mu$ amps.: | Charge ratio $Q_{Co}/Q_{Ho}$ |
|---|---|
| 0.0 | 0.648 |
| 300 | 0.860 |
| 400 | 0.910 |
| 500 | 1.04 |
| 600 | 1.15 |

Figure 3:
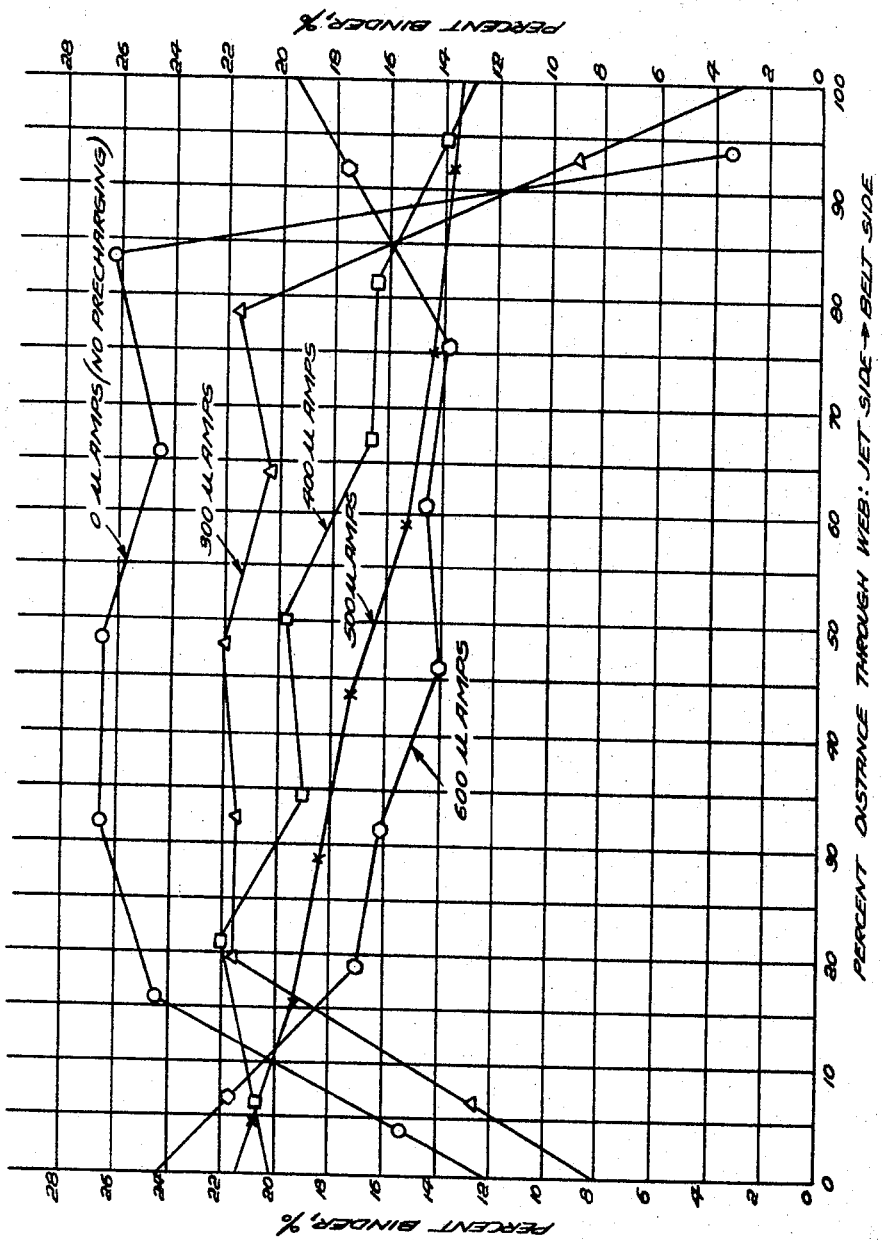
FIGURE 3 is a chart showing the distribution of terephthalate copolyester binder through the thickness of a nonwoven web prepared by the process of FIGURE 2 wherein a terephthalate copolyester and a terephthalate homopolyester are combined. A variety of charging conditions are shown.

Binder distribution through the thickness of each swath laid down was measured by first delaminating the webs into about seven layers of approximately equal thickness and then determining the binder content in each layer via extraction techniques and known analytical techniques. As shown in FIGURE 3 the webs were binder-lean on the surfaces when Co/Ho charge density ratio was low (0.9) and binder-rich on the surfaces when the ratio was high (1.1). The binder was well distributed through the web (about 7% absolute variation) as the ratio approached unity.

EXAMPLE 2

A series of webs were made using an apparatus similar to the one shown in FIGURE 1 with separate corona charging for the copolymer and homopolymer filaments. Polyethylene terephthalate filaments were spun from spinneret 3 and a copolymer derived from ethylene glycol, 79 mole percent terephthalic acid and 21 mole percent isophthalic acid was spun from spinneret 4. There were 250 homopolymer filaments and 50 copolymer filaments with 3.07 denier/filament and 3.01 denier/filament, respectively. Surface-to-surface binder distribution in the web samples was again shown to be a function of the relative surface charge density of the homopolymer and copolymer filaments.

In the set of experiments the filaments were passed through the aspirating jet without application of heat. Using a charging current of 500 microamperes/side for the homopolymer and varying the charge current for copolymer, a number of curves representing through-the-web profiles were obtained as shown in FIGURE 7. Table II below shows the charging conditions, the charge on each fiber composition, and the copolymer/homopolymer charge ratio. Each ion gun had 21 conducting needles mounted parallel to one another on a straight, conducting bar.

TABLE II

| Curve | Charging unit power supply settings µ amperes | | Charge on bundle microcoulombs/m.² | | Charge, ratio |
|---|---|---|---|---|---|
| | Homo-polymer | Co-polymer | Homo-polymer | Co-polymer | |
| X | 500 | 0 | 20.7 | | |
| Y | 500 | 250 | 20.7 | 13.7 | 0.66 |
| Z | 500 | 500 | 20.7 | 19.3 | 0.93 |

With an insufficient charge on the copolymer (0 and 250 microamperes per side) the binder concentration was very low on the outside surface of the web. When the copolymer charge was raised by increasing the corona current applied to the copolymer (500 microamperes), the charge ratio approached unity and the amount of copolymer on the surfaces of the web was appreciably increased. As shown by comparison of FIGURE 7 with FIGURE 3, the binder distribution profiles of the web produced by independent charging of the two threadlines were similar to those produced by precharging the copolymer and then charging the combined filaments together.

The apparatus similar to FIGURE 1 was used in a separate set of experiments wherein heated air was supplied to the aspirating jet which was equipped with a suction diffuser. In this experiment 192 homopolymer filaments and 40 copolymer filaments were provided from the respective spinnerets. The homopolymer filaments were again provided with a charging current of 500 microamperes per side and the copolymer was provided with three different levels of charging current (200, 500, 700 microamperes per side). The charges produced on the two species of filaments are shown in Table III below.

TABLE III

| Curve | Charging unit power supply settings, µ amperes | | Charge on bundle microcoulombs/m.² | | Charge, ratio |
|---|---|---|---|---|---|
| | Homo-polymer | Copolymer | Homo-polymer | Copolymer | |
| P | 500 | 200 | 21.2 | 11.5 | 0.54 |
| Q | 500 | 500 | 21.2 | 20.2 | 0.96 |
| R | 500 | 700 | 21.2 | 25.3 | 1.19 |

The air entering the slot-jet aspirator was heated to 220° C. The copolymer filaments shrank appreciably more in the jet than did the homopolymer filament. However, polymer was supplied at such a rate from the spinnerets as to provide a final denier of 3.77 denier/filament for the homopolymer and 3.67 denier/filament for the copolymer. The distribution of binder and matrix filaments through the web filaments is shown in FIGURE 8. The binder content was less than 10% on the jet side of the collected web when the copolymer charging current was 200 microamperes. It will be noted that at this level the ratio of copolymer to homopolymer charge $Q_{Co}/Q_{Ho}$ is 0.54. For the other two curves shown on FIGURE 8 the charge ratios were 0.96 and 1.19. Both of the latter two experiments provided satisfactory distribution of binder fiber through the web thickness. The resulting webs after bonding in a subsequent heating process resisted delamination, and had good surface abrasion resistance.

EXAMPLE 3

The apparatus of FIGURE 1 was used with the same polymers as in Example 2. The copolymer and homopolymer were separately charged as shown in FIGURE 1. There were 250 homopolymer filaments and 40 to 50 copolymer filaments. A charging current of 600 microamperes per side was provided for the homopolymer. Four different experiments were performed. In two of the experiments the copolymer-charging curernt was set at 400 microamperes per side and in the other two experiments the copolymer-charging current was set at 800 microamperes per isde. At each of the copolymer-charging levels, filaments were made first without heating in the aspirating jet and then with heat in the aspirating jet. In each case the filaments were forwarded to the jet at 4,000 yd./min. In the hot experiments, air to the jet was maintained at 230° C. Binder concentration at various points through the web thickness was then determined. The most uniform through-the-web distribution was obtained for the heat treated fibers with a corona-charging level of 400 microamperes for copolymer and 600 microamperes for homopolymer. On the other hand to obtain uniform distribution in the unheated samples a copolymer-charging current of 800 microamperes was needed along with the 600-microampere homopolymer current.

What is claimed is:

1. A process for preparing a nonwoven web comprising forwarding two bundles of substantially parallel continuous filaments, each bundle being of different polymeric composition, guiding the bundles in the form of ribbons of filaments through separate corona-charging zones, charging each ribbon to the same polarity while under tension in said zones, combining the charged ribbons, forwarding and directing the combined ribbons by means of a jet device toward a receiver, and collecting the filaments in a tensionless state on the receiver as a random nonwoven web.

2. A process for preparing a nonwoven web comprising providing two bundles of substantially parallel continuous filaments of different polymeric composition, guiding one of said bundles in the form of a ribbon of filaments through a corona-charging zone and charging the ribbon in said zone, combining the charged ribbon with the other bundle of filaments in ribbon form, passing the combined ribbons through a corona-charging zone and charging the combined ribbons in said zone, forwarding and directing the combined ribbons by means of a jet device toward a receiver, and collecting the filaments in a tensionless state on the receiver as a random nonwoven web.

3. In an apparatus for preparing a nonwoven web from a plurality of separate running multifilament strands comprising means for continuously providing the strands, means for forming the separate strands into ribbons, means for combining the ribbons of filaments, a jet device for forwarding and directing the combined filaments and a receiver for collecting the filaments as a random nonwoven web, the improvement comprising separate means for corona-charging the ribbons of filaments, said means being located upstream of the jet device.

4. In an apparatus for preparing a nonwoven web from a plurality of separate running multi-filament strands comprising means for continuously providing the strands, means for forming the separate strands into ribbons, means for combining the ribbons of filaments, a jet device for forwarding and directing the combined filaments and a receiver for collecting the filaments as a random nonwoven web, the improvement comprising means for corona-charging one ribbon of filaments located upstream of the combining means and means for corona-charging the combined ribbons, said means being located upstream of the jet device.

References Cited

UNITED STATES PATENTS

| | | | |
|---|---|---|---|
| 3,156,752 | 10/1964 | Cope | 28—15 |
| 3,314,122 | 4/1967 | Bundy | 28—15 |

FOREIGN PATENTS 932,482  7/1963  Great Britain.

PHILIP DIER, *Primary Examiner.*

U.S. Cl. X.R.

28—72; 19—156.3; 156—152, 167, 272, 380, 441; 264—24, 115, 121